(12) United States Patent
Münster et al.

(10) Patent No.: US 7,472,735 B2
(45) Date of Patent: Jan. 6, 2009

(54) PNEUMATIC TIRE

(75) Inventors: John Christian Mathias Münster, Bridel (LU); Romain Fernand Hansen, Bissen (LU); Roland Paul Close, Burg-Reuland (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 283 days.

(21) Appl. No.: 11/487,740

(22) Filed: Jul. 17, 2006

(65) Prior Publication Data

US 2008/0011400 A1   Jan. 17, 2008

(51) Int. Cl.
*B60C 9/18*   (2006.01)
*B60C 9/28*   (2006.01)

(52) U.S. Cl. .................. 152/526; 152/527; 152/535; 152/538

(58) Field of Classification Search ............... 152/538
See application file for complete search history.

(56) References Cited

U.S. PATENT DOCUMENTS

| 5,217,549 A * | 6/1993 | Johnson ................. 152/517 |
| 6,799,618 B2 * | 10/2004 | Reuter et al. ............ 152/527 |
| 2005/0217779 A1 | 10/2005 | Colantonio et al. ....... 152/517 |

FOREIGN PATENT DOCUMENTS

| EP | 1 533 143 A1 | 11/2004 |
| JP | 59-199304 | * 11/1984 |
| JP | 10287105 | * 10/1998 |
| JP | 2006069435 | * 3/2006 |

* cited by examiner

*Primary Examiner*—Justin Fischer
(74) *Attorney, Agent, or Firm*—Robert N. Lipcsik

(57) ABSTRACT

A pneumatic radial tire has a carcass structure, a belt structure, and a tread. The belt structure has at least two plies of reinforcing cords, the cords in the at least two plies being inclined at angles greater than 5° relative to the tire centerline. The cords in the belt plies are inclined at equal but opposite directions relative to the tire centerline. The belt plies have a stiffness variation in the circumferential and meridional directions of the belt plies wherein the stiffness variation is in the range of 12 to 25% between a radially outermost belt ply and a radially innermost belt ply.

12 Claims, 1 Drawing Sheet

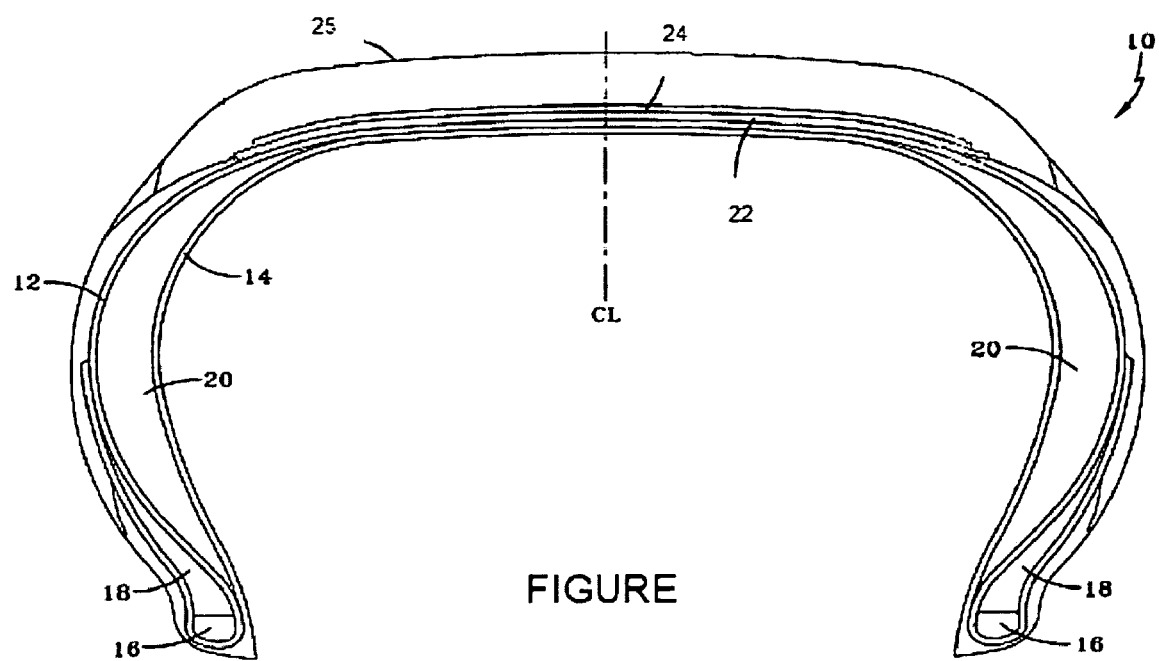
FIGURE

PNEUMATIC TIRE

FIELD OF THE INVENTION

The present invention is directed to pneumatic tire. More specifically, the present invention is directed to a pneumatic radial tire having a particular defined belt construction. The belt construction is useful for both conventional pneumatic tires and pneumatic tires designed for run-flat operations.

BACKGROUND OF THE INVENTION

The term "steering performance" (or simply "steering") refers to a vehicle driver's feeling that a vehicle's steering (and/or "handling") is responsive to movement of the steering wheel. The better the steering performance, the better the driver's "feeling" of having control over the vehicle's steering. Because it relates to a "feeling" on the part of a driver, steering performance is essentially a subjective evaluation of a vehicle's steering. Steering performance can change over time, mainly deteriorating as components in the vehicle steering system wear, age, or suffer damage. Steering system components include the steering wheel, the tires and wheels, and everything in between such as the steering box, any power assist components, and linkages and joints. Steering performance can also vary with operating conditions, including, for example, road texture, vehicle speed, steering wheel settings, minor tire inflation pressure changes, and tire/wheel uniformity changes (e.g., balance).

Steering performance loss is mostly a concern in passenger vehicles with pneumatic tires and power assisted steering (power steering), although the phenomenon has also been observed in passenger vehicles without power steering. Although a trained driver can determine steering performance at virtually any vehicle speed, the steering performance (and therefore a change in performance, e.g., SP-Loss) is most noticeable above a certain vehicle speed threshold. Even though SP-Loss is generally a change over time, it can be practically instantaneous. In regards to tires and the steering performance of a vehicle, the ideal tire is one in which any steering performance change is reduced or eliminated if possible, creating a more stabile tire performance.

SUMMARY OF THE INVENTION

The present invention is directed to a pneumatic tire wherein the belt package of the tire is selected to assist in maintaining the steering performance of the tire over the effective, useful life of the tire.

Disclosed is a pneumatic radial tire comprising a carcass structure, a belt structure, and a tread. The belt structure has at least two plies of reinforcing cords, the cords in the at least two plies being inclined at angles greater than 5° relative to the tire centerline. The cords in the belt plies are inclined at equal but opposite directions relative to the tire centerline. The belt plies have a stiffness variation in the circumferential and meridional directions of the belt plies wherein the stiffness variation is in the range of 12 to 25% between a radially outermost belt ply and a radially innermost belt ply. Preferably, the stiffness variation between the innermost and outermost plies is in the range of 15 to 20%; most preferably in the range of 16 to 17%.

In one aspect of the disclosed invention, the reinforcing cords in the belt plies have the same cord structure.

In another aspect of the disclosed invention, the number of reinforcing cords per inch, in the meridional direction of the tire, in the radially innermost belt ply is greater than the number of reinforcing cords per inch in the radially outermost belt ply. Preferably, the difference in the number of reinforcing cords per inch between the radially innermost belt ply and the radially outermost belt ply is in the range of 2 to 10.

In another aspect of the invention, the belt structure has more than two cord reinforced plies. When the belt structure has more than two plies, the overall stiffness gradient between the innermost and outermost belt plies is in the desired range of 12 to 25%. The stiffness gradient between directly adjacent belt plies should be equal to each other and/or the stiffness gradient should decrease in the radially outward direction of the tire to create a step-down effect and gradual decrease in stiffness of the belt structure from the interior of the tire to the exterior of the tire.

In another aspect of the disclosed invention, the carcass structure has at least one carcass reinforcing ply and has at least one pair of sidewall wedge inserts, with a single wedge insert in each tire sidewall. The wedge inserts provide the tire with self-supporting run-flat capabilities.

BRIEF DESCRIPTION OF THE DRAWINGS

The invention will be described by way of example and with reference to the accompanying drawings in which the FIGURE illustrates a cross-sectional view of a pneumatic tire.

DETAILED DESCRIPTION OF THE INVENTION

The following language is of the best presently contemplated mode or modes of carrying out the invention. This description is made for the purpose of illustrating the general principles of the invention and should not be taken in a limiting sense. The scope of the invention is best determined by reference to the appended claims.

Illustrated in the FIGURE is a cross-sectional view of a self-supporting pneumatic runflat tire 10. Although not limited thereto, the illustrated tire 10 is of an intermediate aspect ratio. It has a carcass structure comprising a carcass reinforcing ply 12, a gas-impervious inner liner 14, a pair of beads 16, a pair of bead filler apexes 18, and a pair of sidewall wedge inserts 20. Each sidewall wedge insert 20 is located between the carcass reinforcing ply 12 and the inner liner 14. It will be appreciated by those skilled in the art that for self-supporting tires, multiple reinforcing plies may be employed as carcass reinforcing plies, as well as multiple sidewall wedge inserts in a variety of configurations for both single and multiple carcass reinforcing plies.

Located radially outward of the carcass structure is a belt structure. The belt structure has at least two cross cord reinforcing plies 22, 24. The cords of the plies 22, 24 are inclined at angles greater than 5° relative to the tire centerline CL, with the cords in each ply 22, 24 being oppositely inclined relative to the cords in the adjacent ply. While not illustrated in FIG. 1, radially outward of the cross cord reinforcing plies 22, 24, an overlay ply may be placed. An overlay ply has cords inclined at not more than 5° relative to the tire centerline CL, and has an axial width greater than the widest cross cord reinforcing ply 22 or 24 so as to completely cover the edges of all the cross cord reinforcing plies 22, 24.

Radially outward of the belt structure is a tread 25. The tread 25 will has a tread pattern comprised of a series of lateral and circumferential grooves, not illustrated. The tread is conventionally formed of a single elastomer, but may also be comprised of multiple elastomers, the different elastomers arranged radially in a cap/base formation or axially to create a zoned tread.

In accordance with the invention, to improve the ride and handling properties of the tire, the reinforcing plies 22, 24 of the belt structure are selected to create a stiffness gradient wherein the stiffness of the plies located closer towards the interior of the tire is greater than the stiffness of the plies located closer to the exterior of the tire. The stiffness of the plies 22, 24 is the circumferential and meridional bending stiffness of the plies. The logic behind a stiffness gradient for the belt package is based on the need to reduce the stress on tire components as the tire rotates and transfers forces to the road surface. Using this logic, the tire elements that are closer to the road surface as the tire travels through the footprint contact patch should have a reduced stiffness in comparison to other components further from the footprint contact patch. Thus a radially outer belt ply 24 should not be as stiff as a radially inner belt ply 22. Preferably, both the circumferential and meridional bending stiffness gradient between the radially innermost belt ply 22 and the radially outermost belt ply 24 is in the range of 12 to 25%, preferably in the range of 15% to 20%, with a preferred optimum of 16% to 17%.

In conventional tires, the reduced width of the radially outer belt plies, and the reduction in belt ply widths in the radially outer direction of the belt structure, has resulted in a small stiffness gradient in the belt structure; however, this stiffness reduction has not been enough to achieve any significant reduction in steering performance loss. Other possible methods to create a stiffness gradient within the belt structure include varying the inclination angle of the adjacent plies and using different cord materials (i.e. adjacent plies of high tensile steel and normal tensile steel or adjacent plies of aramid and steel). However, Applicants determined that these two methods, while creating a stiffness gradient, did not improve the stability of the tire performance as desired.

To achieve the desired stiffness gradient in the belt structure, and obtain the improved stability in the steering performance loss of the tire 10, employing cords having the same structure in the two adjacent belt plies 22, 24, the cords of the radially innermost belt ply 22 have an end count per inch (epi), measured in the meridional direction of the tire, greater than the epi in the radially outermost belt ply 24. The difference in the end count is in the range of 2 to 10, with a preferred difference range of 4 to 8, most preferable of 4 to 5. For some cord structures, whether the belt cord is a textile or steel cord, the difference in epi may result in the desired stiffness gradient. For some steel cord structures comprising fewer than five filaments per cord, and having filament diameters in the range 0.20 to 0.45, the desired stiffness gradient is also achieved by the combination of the difference in epi for the different belt plies 22, 24 and the reduction in axial width of the radially outer belt plies 24.

An alternative to achieve the desired stiffness gradient in the belt structure is to vary the coating compound of the different belt plies 22, 24, with the radially inner belt ply 22 having a coating compound having a greater stiffness properties than the coating compound forming the radially inner belt ply 24. Another alternative to achieve the desired stiffness gradient in the belt structure when employing cords of the same structure in the belt plies 22, 24 is to vary the gauge of the coating compound on the different plies 22, 24 wherein the radially inner belt ply 22 has a greater coating compound gauge than the radially outer ply 24.

With the tire 10 is illustrated as having only two belt plies 22, 24 in the belt structure, the belt structure may comprise more than two plies. When forming the tire 10 with more than two belt plies, all of the working belt plies, i.e. those with cords being inclined at greater than 5° relative to the tire centerline CL, are subject to the desired stiffness gradient. The stiffness gradient in the circumferential and meridional direction between the radially innermost belt ply and the radially outermost belt ply is within the stated range of 12 to 25%.

For a three belt ply belt structure, the intermediate ply has a stiffness less than the radially innermost ply and greater than the radially outermost ply. The stiffness difference between the radially innermost belt ply and the intermediate belt ply is equal or greater to the stiffness difference between the intermediate belt ply radially outermost. These different stiffness gradients within the belt structure may be viewed as a stepping down of the stiffness differences between directly adjacent layers in the radially outer direction wherein the actual step down value in stiffness in the radially outer direction of the belt structure is always equal or less than any radially inner stiffness gradient. This stepping down in stiffness between adjacent stiffness gradients created within the belt structure creates a gradual reduction in the stiffness in the radially outer direction of the belt structure. This would also be applicable to tires 10 having a belt structure comprising four or more working belt plies, regardless of the remaining tire structure.

While the illustrated FIGURE is a tire 10 having a self-supporting tire structure by means of the sidewall wedge inserts 20, the disclosed belt structure having a defined stiffness gradient is also applicable and useful in achieving a more stable steering performance loss in conventional, non self-supporting run-flat type of tires. While the disclosed belt structure may be used in a variety of tires, the desired goal of improved performance stability is more suitable and readily achieved for high performance type tires; that is, tires having an aspect ratio between 30 and 70%, and a maximum speed capability above 200 km/hr.

What is claimed is:

1. A pneumatic radial tire comprising a carcass structure, a belt stucture, and a tread, wherein the belt structure is comprised of at least three plies of reinforcing cords, the cords in the at least three plies being inclined at angles greater than 5% relative to a centerline of the tire, the tire being characterized by having a stiffness variation in the circumferential and meridional directions of the at least three belt plies wherein a first radially innermost ply has a first stiffness, a second radially itermediate ply has a second stiffness, and a third radially outermost ply has a third stiffness, the first stiffness being greater than the second stiffness and the second stiffness being greater than the third stiffness, and a difference between the first stiffness and second stiffness being greater than a difference between the second stiffness and the third stiffness, a stiffness variation between the first stiffness and the third stiffness being in the range of 12 to 25%.

2. The tire claim 1 wherein the reinforcing cords in the at least three belt plies have the same cord structure.

3. The tire of claim 1 wherein the number of reinforcing cords per inch, in the meridional direction of the tire, in the first radially innermost belt ply is greater than the number of reinforcing cords per inch in the second radialy intermediate belt ply and the third radially outermost belt ply and the number of reinforcing cords per inch, in the meridional direction of the tire, in the radially intermediate belt ply is greater than the number of reinforcing cords per inch in the third radially outermost belt ply.

4. The tire of claim 3 wherein the difference in the number of reinforcing cords per inch between the first radially innermost belt ply and the third radially outermost belt ply is in the range of 2 to 10.

5. The tire of claim 3 wherein the difference in the number of reinforcing cords per inch between the first radially innermost belt ply and the third radially outermost belt ply is in the range of 4 to 8.

6. The tire of claim 3 wherein the difference in the number of reinforcing cords per inch between the first radially innermost belt ply and the third radially outermost belt ply is in the range of 4 to 5.

7. The tire of claim 1 wherein the carcass structure is comprised of at least one carcass reinforcing ply, and at least one pair of sidewall wedge inserts.

8. The tire of claim 1 wherein the belt structure is further comprised of an overlay ply located radially outward of the at least three inclined cord belt plies, the overlay ply comprising cords inclined at angles of not more than 5% relative to the tire centerline.

9. The tire of claim 1 wherein the stiffness variation is in the range of 15% to 20% between a radially outermost belt ply and a radially innermost belt ply.

10. The tire of claim 1 wherein the stiffness variation is in the range of 16 to 17% between a radially outermost belt ply and a radially innermost belt ply.

11. The tire of claim 1, the tire having an aspect ratio between 30 and 70%.

12. Tire of claim 1, the tire having a maximum speed capability above 200 km/her.

* * * * *